(12) United States Patent
Di Cairano et al.

(10) Patent No.: US 9,840,261 B2
(45) Date of Patent: Dec. 12, 2017

(54) AUTOMATIC TRAIN STOP CONTROL SYSTEM

(71) Applicant: Mitsubishi Electric Research Laboratories, Inc., Cambridge, MA (US)

(72) Inventors: Stefano Di Cairano, Somerville, MA (US); Mehmet Alphan Ulusoy, Medford, MA (US); Sohrab Haghighat, San Carlos, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/175,152

(22) Filed: Jun. 7, 2016

(65) Prior Publication Data
US 2016/0280242 A1   Sep. 29, 2016

Related U.S. Application Data

(63) Continuation of application No. 14/664,993, filed on Mar. 23, 2015, now Pat. No. 9,387,866.

(51) Int. Cl.
*B61L 27/04*   (2006.01)
*B61L 3/00*   (2006.01)
(Continued)

(52) U.S. Cl.
CPC ............... *B61L 27/04* (2013.01); *B60T 7/18* (2013.01); *B60T 13/665* (2013.01); *B60T 17/228* (2013.01); *B61H 13/00* (2013.01); *B61L 3/008* (2013.01); *B61L 15/0081* (2013.01); *B61L 25/021* (2013.01); *B61L 25/025* (2013.01); *B61L 25/026* (2013.01); *B60L 3/0015* (2013.01); *B61L 1/188* (2013.01); *B61L 3/00* (2013.01); *B61L 3/08* (2013.01); *B61L 3/221* (2013.01); *B61L 3/24* (2013.01);
(Continued)

(58) Field of Classification Search
CPC ..... H04W 74/04; H04W 28/26; H04W 88/08; B61L 13/00; B61L 27/00; B61L 15/00; B61L 3/00; B61L 3/12; B61L 3/008; B61L 27/04; F02D 31/00; B60T 7/12; B60T 7/128; B60L 15/40; B60L 3/0015; B60W 10/06
See application file for complete search history.

(56) References Cited

U.S. PATENT DOCUMENTS 3,655,962 A * 4/1972 Koch ................. B60T 7/128
 246/182 C
3,913,419 A * 10/1975 Sale ................. F02D 31/00
 477/54

(Continued)

*Primary Examiner* — Behrang Badii
(74) *Attorney, Agent, or Firm* — Gene Vinokur; James McAleenan; Hironori Tsukamoto

(57) ABSTRACT

A method controls a movement of a train to a stop at a stopping position between a first position and a second position. The method determines constraints of a velocity of the train with respect to a position of the train forming a feasible area for a state of the train during the movement, such that an upper curve bounding the feasible area has a zero velocity only at the second position, and a lower curve bounding the feasible region has a zero velocity only at the first position. Next, the method controls the movement of the train subject to the constraints.

7 Claims, 15 Drawing Sheets

(51) Int. Cl.
*B61H 13/00* (2006.01)
*B60T 7/18* (2006.01)
*B60T 13/66* (2006.01)
*B60T 17/22* (2006.01)
*B61L 15/00* (2006.01)
*B61L 3/08* (2006.01)
*B61L 27/00* (2006.01)
*B61L 3/24* (2006.01)
*B61L 3/22* (2006.01)
*B61L 1/18* (2006.01)
*H04L 27/148* (2006.01)
*H04L 27/14* (2006.01)
*B61L 25/02* (2006.01)
*B60L 3/00* (2006.01)
*G05D 3/00* (2006.01)

(52) U.S. Cl.
CPC ............... *B61L 25/02* (2013.01); *B61L 27/00* (2013.01); *B61L 27/0038* (2013.01); *G05D 3/00* (2013.01); *H04L 27/14* (2013.01); *H04L 27/148* (2013.01)

(56) References Cited

U.S. PATENT DOCUMENTS

| | | | |
|---|---|---|---|
| 9,642,163 B2 * | 5/2017 | Nagasaki | B60L 15/40 |
| 2013/0151107 A1 | 6/2013 | Nikovski et al. | |
| 2015/0014488 A1 * | 1/2015 | Saito | B60L 3/0015 246/184 |

* cited by examiner

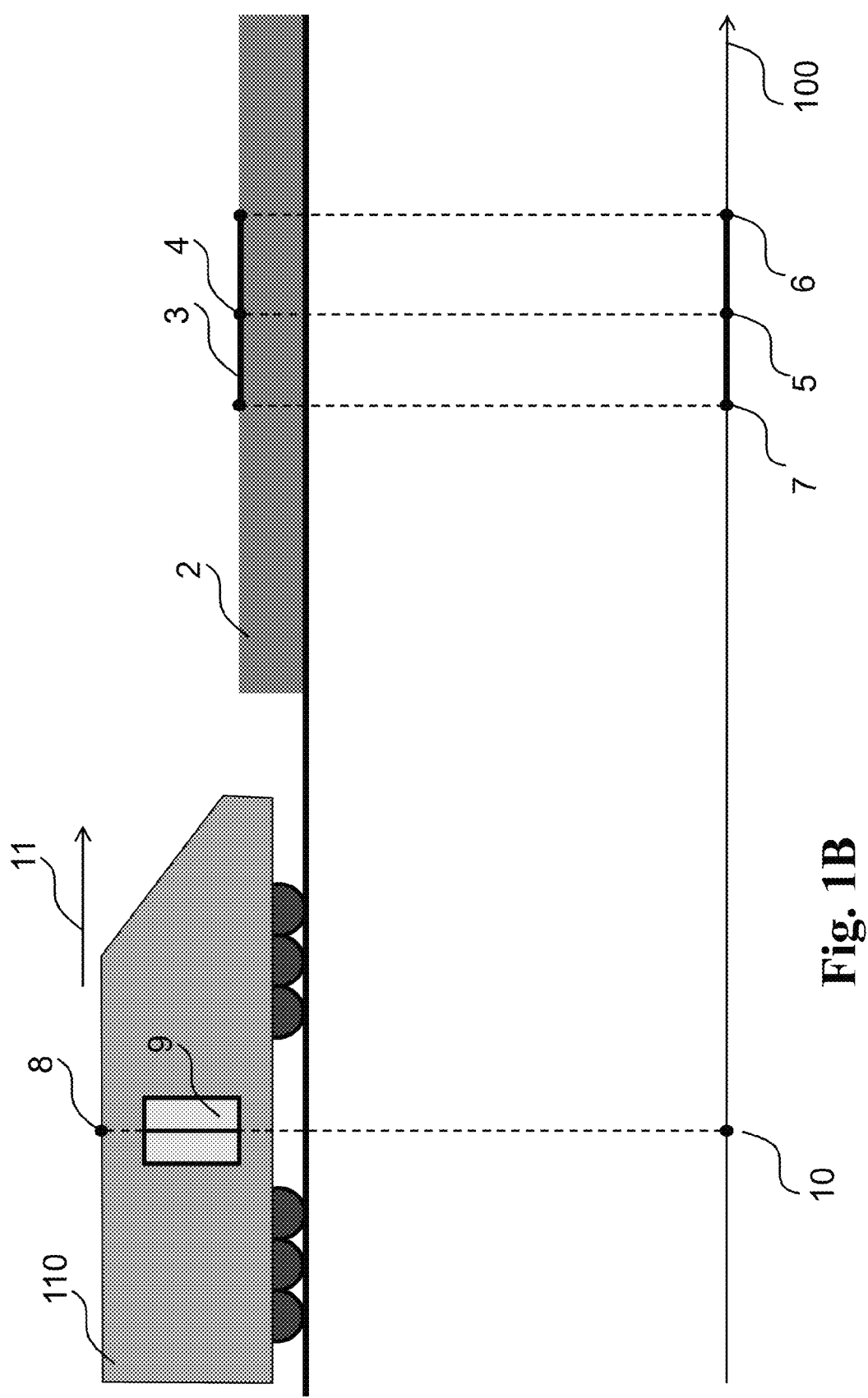

AUTOMATIC TRAIN STOP CONTROL SYSTEM

FIELD OF THE INVENTION

The present invention relates generally to automated process control, and more particularly to a system and a method for stopping a train at a position with an automatic control.

BACKGROUND OF THE INVENTION

The Train Automatic Stop Control (TASC) system, which is often part of an Automatic Train Operation (ATO) system, manages the train braking system to stop the train at the predetermined location. The TASC system receives measurements from sensors, on the train and/or on remote stations via communication networks, estimates the state of the train including a position and a velocity of the train, and selects the actions for the braking system. These steps are repeated multiple times until the train stops.

The TASC system allows the trains equipped with TASC to stop automatically at stations without the need to operate the brakes manually. The TASC was originally developed in the 1950s and the 1960s as a way of ensuring that trains stop properly at stations, especially if the driver has made a minor driving lapse and stopped with a slight overrun/underrun. When station platforms are provided with screen doors, the doors of the train must be aligned with the platform doors as otherwise the operation of automatic trains, particularly driverless underground trains, is disrupted.

Most of the conventional methods select the control action in the TASC system according to one of many possible velocity profiles determined based on a distance between the current position of the train and the stop position see, for example, U.S. 2013/0151107. The velocity profile is called a run curve. If a distance along the route is denoted by z, then a desired velocity v(z) at position z describes the run curve. The run curve has to obey legal and mechanical constraints of the route, e.g. speed limits, safety margins, and must be physically realizable by mechanisms of the train.

However, the generation of those velocity profiles are difficult and/or time and resource consuming. In addition, the selection of the optimal velocity profile is prone to errors due to uncertainty of some of the parameters of the movement of the train, such mass of the train mass, and the track friction. In practice, many reference profiles are generated before train operation based on different assumptions of train and environmental parameters, and the one to be used in each operations of stopping is selected based on evaluating the current conditions. However, there is not guarantee that one curve satisfying exactly the current conditions is available, and/or that the current conditions are exactly known, and/or that the conditions do not change during execution of the stopping.

For instance, a run curve can be selected based on high friction of the rails as in the case of dry rails to minimize the stopping time by exploiting the high rail friction. If the rail conditions change during the stopping, for instance due to encountering a section of track where the rails are wet which reduces the rail friction, it may be impossible to achieve the desired braking effort. Hence the train velocity profile would deviate from the run curve, and the train stop pasts its desired stopping point, missing alignment with the station.

Furthermore, separation of trajectory generation and control to follow trajectory can fail to follow the selected run curve exactly due to, e.g., the imprecisions of the braking system, change of the train parameters, and external disturbances, so the train can fail to stop at desired location. In theory, a feedback control can aim to track the selected run curve while reducing the effect of external uncertainties and improperly selected assumptions. However, the feedback control usually cannot provide definite guarantees of the performance in tracking an externally generated signal.

Furthermore, it is in general not optimal to first generate a trajectory and then control the train to follow the trajectory based on feedback from sensors that adjusts to current conditions, due to a two steps design procedure. In addition, the concurrent generation of the trajectory and feedback control action subject to uncertainty in the parameters it is notoriously difficult to achieve because the uncertainty reduces the accuracy of prediction of the future behavior of the train, which is required for optimization.

Accordingly, there is a need to provide a system and a method for stopping a train at a position with an automatic control, but without the predetermined velocity profiles.

SUMMARY OF THE INVENTION

Some embodiments of the invention are based on the realization that it is possible to define constraints of a state of a movement of the train, such that a constraint movement of the train stops of the train at a predetermined stopping range. Thus, the control of the movement of the train according to a velocity pattern that is prone to errors can be substituted with a control of the movement of the train subject to those special constraints which are independent of the train and environment parameters.

Specifically, some embodiments of the invention determines a feasible region for a state of the train, such that the feasible region includes at least one state with zero velocity at the stopping range, and controls the movement of the train such that the state of the train is always within that region. For example, some embodiments design a controller those select the braking system action that to maintain the state of the train within the feasible region by repeatedly solving an optimization problem. Accordingly, some embodiments of the invention transform the tracking problem into an optimization problem subject to constraints.

In such a manner, the embodiments enable stopping a train at a position with an automatic control, but without the predetermined velocity profiles. This is because the constraints on the state of the movement of the train that guarantees the stopping of the train at the predetermined stopping range can be generated without the velocity profiles. For example, instead of generating multiple velocity profiles, only two constraints defining a lower and an upper curve of the feasible region can be determined. It is also realized in this invention that the selection of the constraints affects the minimum and maximum arrival time of the train at the position, such that the time of arrival can be used as guidance for generating those constraints.

For example, some embodiments determine a lower curve and an upper curve bounding a velocity of the train with respect to a position of the train, such that the upper curve has a zero velocity only at the farthest border of a stopping range, and the lower curve has a zero velocity only at the nearest border of the stopping range, and determine the feasible region for a state of the train using the lower and the upper curves and mechanical and/or legal constraints on the movement of the train.

For example, in one embodiment the upper curve is a first line with a first slope, and the lower curve is a second line with a second slope. Usually, the first slope is greater than the second slope to enforce a sufficient size for the feasible region. This embodiment reduces the selection of the constraints only to the values for the slopes of the first and the second lines.

It is also realized that the selection of the constraints affects the minimum and maximum arrival time of the train at the stopping range, and the desired arrival time can be used in the selection of the two parameters. For example, one embodiment selects the value of the first slope based on a minimal stopping time, and selects the value of the second slope based on a maximal stopping time.

Due to the nature of optimization-based receding horizon control, the existence of a solution for a certain horizon does not by itself guarantees the existence of the solution for a subsequent horizon. However, some embodiments of the invention are based on yet another realization that it is possible to select a subset of the feasible region, such that from any state of the train and any possible variations in the parameters of the movement of the train, there is a control maintaining the state of the train within the subset. Accordingly, if a cost function representing the movement of the train is optimized subject to constraints defined by that special subset of the feasible region, as contrasted with the optimization within the feasible region itself, there is a guarantee that the train stops within the predetermined stopping range.

Accordingly, one embodiment discloses a method for controlling of a movement of a train to a stop at a stopping position between a first position and a second position. The method includes determining constraints of a velocity of the train with respect to a position of the train forming a feasible area for a state of the train during the movement, such that an upper curve bounding the feasible area has a zero velocity only at the second position, and a lower curve bounding the feasible region has a zero velocity only at the first position; and controlling the movement of the train subject to the constraints. The steps of the method are performed by a processor.

Another embodiment discloses a system for controlling of a movement of a train to a stop at a stopping position between a first position and a second position. The system includes a constraint generating unit for determining constraints of a velocity of the train with respect to a position of the train forming a feasible area for a state of the train during the movement, such that an upper curve bounding the feasible area has a zero velocity only at the second position, and a lower curve bounding the feasible region has a zero velocity only at the first position, wherein the upper curve is a first line with a first slope, and the lower curve is a second line with a second slope and the first slope is greater than the second slope; and a controller for controlling the movement of the train subject to the constraints.

Yet another embodiment discloses a method for controlling of a movement of a train to a stop at a stopping position between a first position and a second position. The method includes determining constraints of a velocity of the train with respect to a position of the train forming a feasible area for a state of the train during the movement, such that an upper curve bounding the feasible area has a zero velocity only at the second position, and a lower curve bounding the feasible region has a zero velocity only at the first position; determining a control invariant subset of the feasible region, wherein for each state within the control invariant subset there is at least one control action maintaining the state of the train within the control invariant subset; and controlling the movement of the train subject to the constraints by selecting a control action maintaining the state of the train within the control invariant subset of the feasible region. The steps of the method are performed by a processor.

BRIEF DESCRIPTION OF THE FIGURES

FIGS. 1A and 1B are schematics of a system for controlling of a movement of a train to a stop at a stopping position according to one embodiment of the invention;

DETAILED DESCRIPTION

Figure 1A:
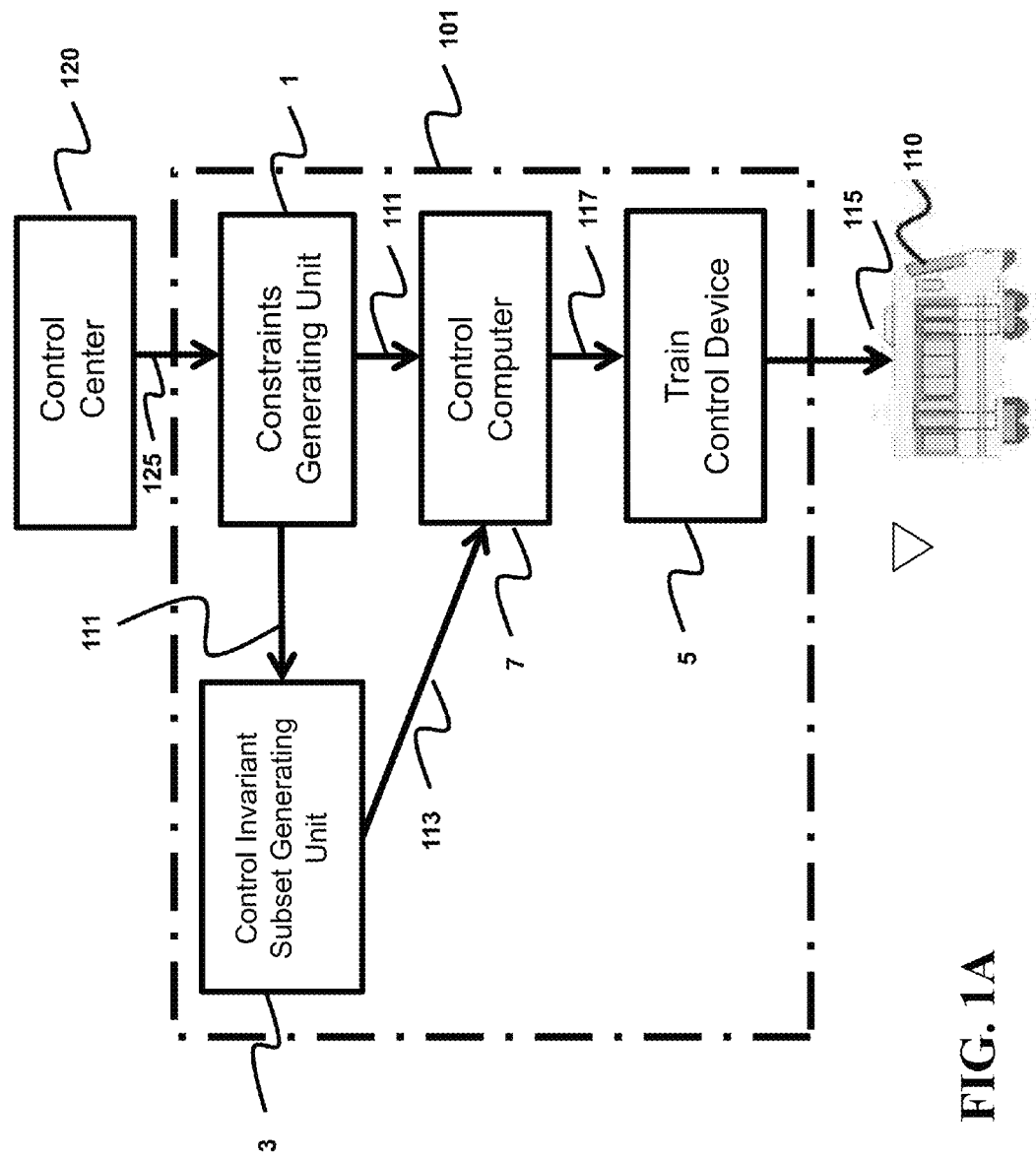

FIGS. 1A and 1B show a system for controlling of a movement of a train 110 to a stop at a stopping position. In this disclosure, the term "train" is used generally and includes any guided means of transportation, such as, but not limited to, electrical trains, guided transport systems at airports, or guided hybrid cars. The train can be provided with wheels, often referred to as rolling stocks that are in contact with and roll on the rail tracks.

A control system 101 controls the movement of the train 110 traveling towards a station 2 such that the train stops at a pre-determined range of positions 3 between a first position 7 and a second position 6 without stopping anywhere else. Some embodiments select a reference system 100 having the origin 5 at a point 4 in the stopping range 3. Thus, the first positions $\epsilon_{min}<0$, and the second position $\epsilon_{max}>0$, $\epsilon_{max}>\epsilon_{min}$ are the nearest 7 and furthest 6 positions with respect to the current position of the train where the train is allowed to stop. As used herein, when the train moved to the stop at the stopping position, the train has a zero velocity at the stopping position.

The current position d 10 of the train can be determined as the distance of a specific point 8 of the train, such as the center of the first door 9, from the origin 5 of the reference system, where d is negative when the train is at a position before the origin with respect to the normal direction of movement of the train. The velocity of the train 11 is v, where v is positive when the train is moving in its normal direction of the movement.

A control system 101 of the train 110 can include one or combination of a constraints generating unit 1, a control invariant subset generating unit 3, a train control device 5, and a control computer 7. In some embodiments, the constraints generating unit 1 determines stopping constraints 111 of a velocity of the train with respect to a position of the train forming a feasible area for a state of the train during the movement leading the train to the stop, and the control computer 7 controls the movement of the train subject to the constraints. The control can be achieved, e.g., by generating a control input 117 to the train control device 5 controlling 115 the break system of the train.

In various embodiments, the stopping constraints are determined without having a predetermined run-curve leading the train from the current position to the stopping position. In effect, the control of the movement of the train according to a velocity pattern that is prone to errors is substituted with a control of the movement of the train subject to those special constraints. Accordingly, some embodiments of the invention transform the tracking problem into an optimization problem subject to constraints. Such transformation is advantageous, because the constrained control can guarantee that the constraints are always satisfied. That guarantee might not be possible for the tracking according to a predetermined run-curve.

For example, some embodiments determine, for each time step of control, a control action moving the train from a current position to a next position within the feasible region. In those embodiments, the controlling includes determining a sequence of control inputs forming an ad-hoc run-curve leading the train from the current position to the stopping position. Such ad-hoc run-curve determination is advantageous because eliminates efforts need to generate and test predetermined run-curves. Also, reformulating the stopping into a constrained problem allows handling the stopping constraints with other constraints on the movement of the trains, such as constraints on traction and braking force range, actuator rate, and/or maximum and minimum speed of the train.

However, due to the nature of optimization-based receding horizon control, the existence of a solution for a certain horizon does not by itself guarantees the existence of the solution for a subsequent horizon. Thus, some embodiments also optionally include the control invariant subset generating unit 3 for selecting a control invariant subset 113 from the feasible region defined by the stopping constraints. These embodiments are based on yet another realization that it is possible to select a subset of the feasible region, such that from any state of the train and any possible variations in the parameters of the movement of the train, there is a control maintaining the state of the train within the subset.

For example, some embodiments design a controller those select the braking system action that to maintain the state of the train within the feasible region by repeatedly solving an optimization problem. Accordingly, if a cost function representing the movement of the train is optimized subject to constraints defined by that special control invariant subset of the feasible region, as contrasted with the optimization within the feasible region itself, there is a guarantee that the train stops within the predetermined stopping range. For example, in various embodiments, the cost function represents one or combination of the energy consumption of the train during the trip, a time of the trip, both the energy consumption and the time of the trip, or the energy consumption for a predetermined time of the trip.

Soft Landing Constraints

For example, to stop the train at the stopping position within the stopping range, it is sufficient for the train distance from target d, and velocity v, to satisfy at any time instant soft landing constraints $$v(t) \leq \Gamma_{max}(\epsilon_{max} - d(t))$$

$$v(t) \geq \Gamma_{min}(\epsilon_{min} - d(t)), \quad (1)$$

wherein $\Gamma_{max}(s)$, $\Gamma_{min}(s)$ are the upper border function and the lower border function that are defined in the range $s \in (-\infty, c]$ where $c \geq \epsilon_{max}$, are continuous, greater than 0 when their arguments are positive, smaller than 0 when their arguments are negative, and 0 when their arguments are 0. Furthermore for any $s \in (-\infty, c]$, $\Gamma_{max}(s) \geq \Gamma_{min}(s)$ and $\Gamma_{max}(c) = \Gamma_{min}(c)$.

Figure 2A:
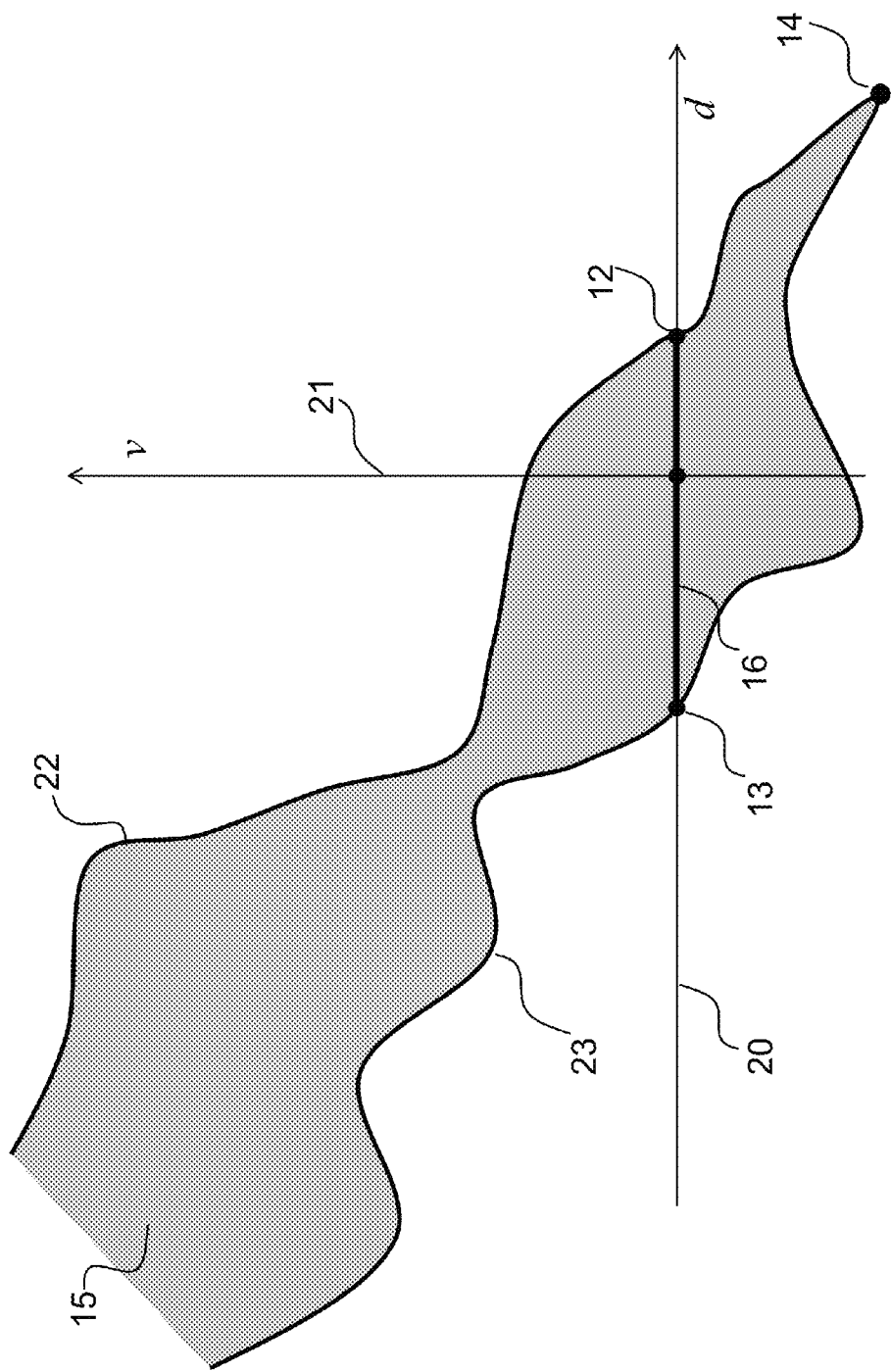
FIG. 2A is an example of the feasible area for a state of the train during the movement determined according some principles of embodiment of the invention.

FIG. 2A shows an example of the feasible area 15 for a state of the train during the movement. In this example, a Cartesian axis with train position d is on the x axis 20, and train velocity v is on the y axis 21. An upper curve 22 bounding the feasible area 15 has a zero velocity only at the second position 12, i.e., the upper curve intersects the x axis at a distance 12 equal to $\epsilon_{max}$. Similarly, a lower curve 23 bounding the feasible region has a zero velocity only at the first position 13, i.e., the lower curve intersects the x axis at a distance 13 equal to $\epsilon_{min}$. The upper and the lower curves can intersect at the same point 14 at distance $c > \epsilon_{max}$.

Intuitively, if the feasible area 15 includes the current position of the train and the state of the train is controlled to be maintained within the feasible area 15, at some instant of time the state of the train is guaranteed to be on a segment 16 between the points 13 and 12, which corresponds to a zero velocity of the train at the predetermined stopping range.

For example, when $d < \epsilon_{min}$ the constraints (1) forces the train velocity to be positive, so that the train moves towards the target, when $d > \epsilon_{max}$ the constraints (1) forces the train velocity to be negative and hence the train moves towards the target, and that hence any trajectory of the train must include a point of zero velocity in the range of positions between $\epsilon_{max}$ and $\epsilon_{min}$, which means that the train stops at a desired stopped range.

Figure 2B:
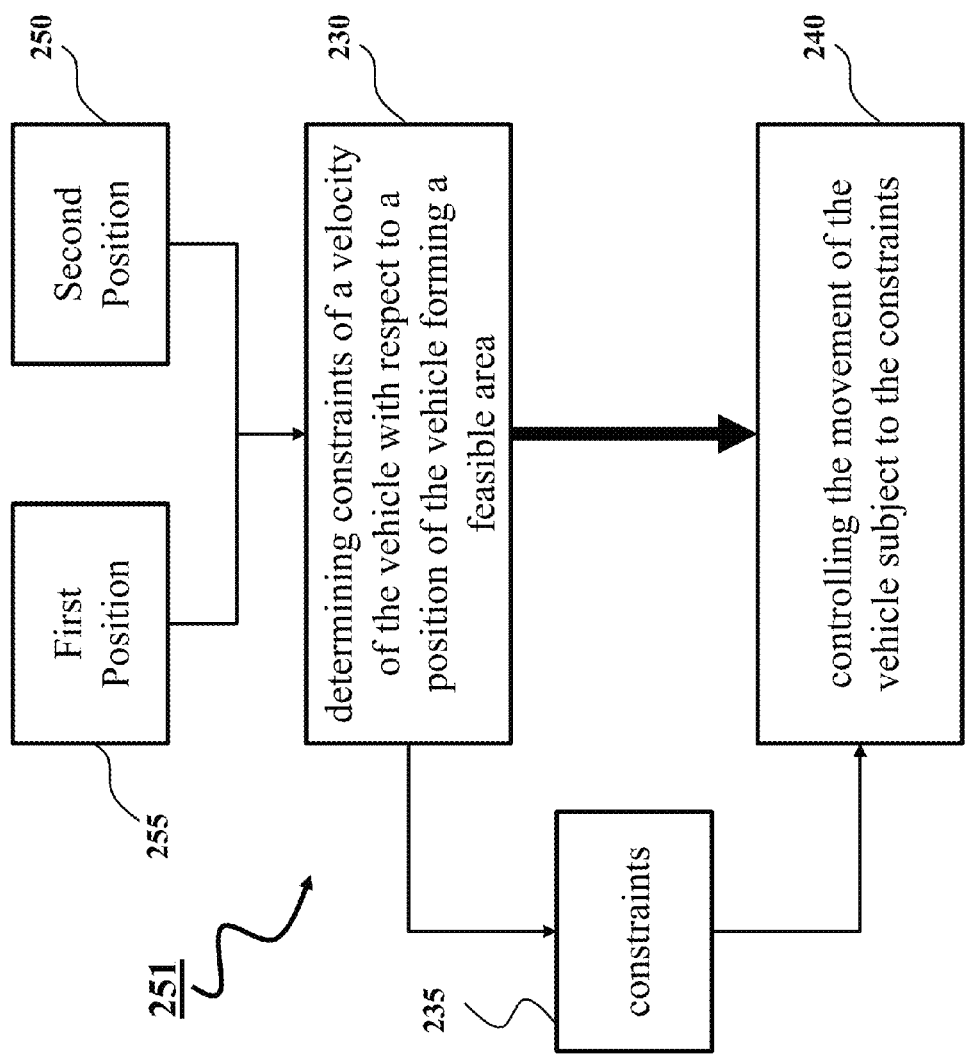
FIG. 2B is a block diagram of a method for controlling of a movement of a train to a stop at a stopping position according to one embodiment of the invention.

FIG. 2B shows a block diagram of a method for controlling of a movement of a train to a stop at a stopping position between a first position 255 and a second position 250 according to one embodiment of the invention. The method determines 230 constraints 235 of a velocity of the train with respect to a position of the train. The constraints 235 are stopping constraints that form a feasible area for a state of the train during the movement, such that satisfaction of the stopping constraint guaranties the stopping of the train at the stopping position. The constraints 235 are determined such that an upper curve bounding the feasible area has a zero velocity only at the second position, and a lower curve bounding the feasible region has a zero velocity only at the first position. Next, the method controls the movement of the train subject to the constraints. Steps of the method are performed by a processor 251.

Figure 3:
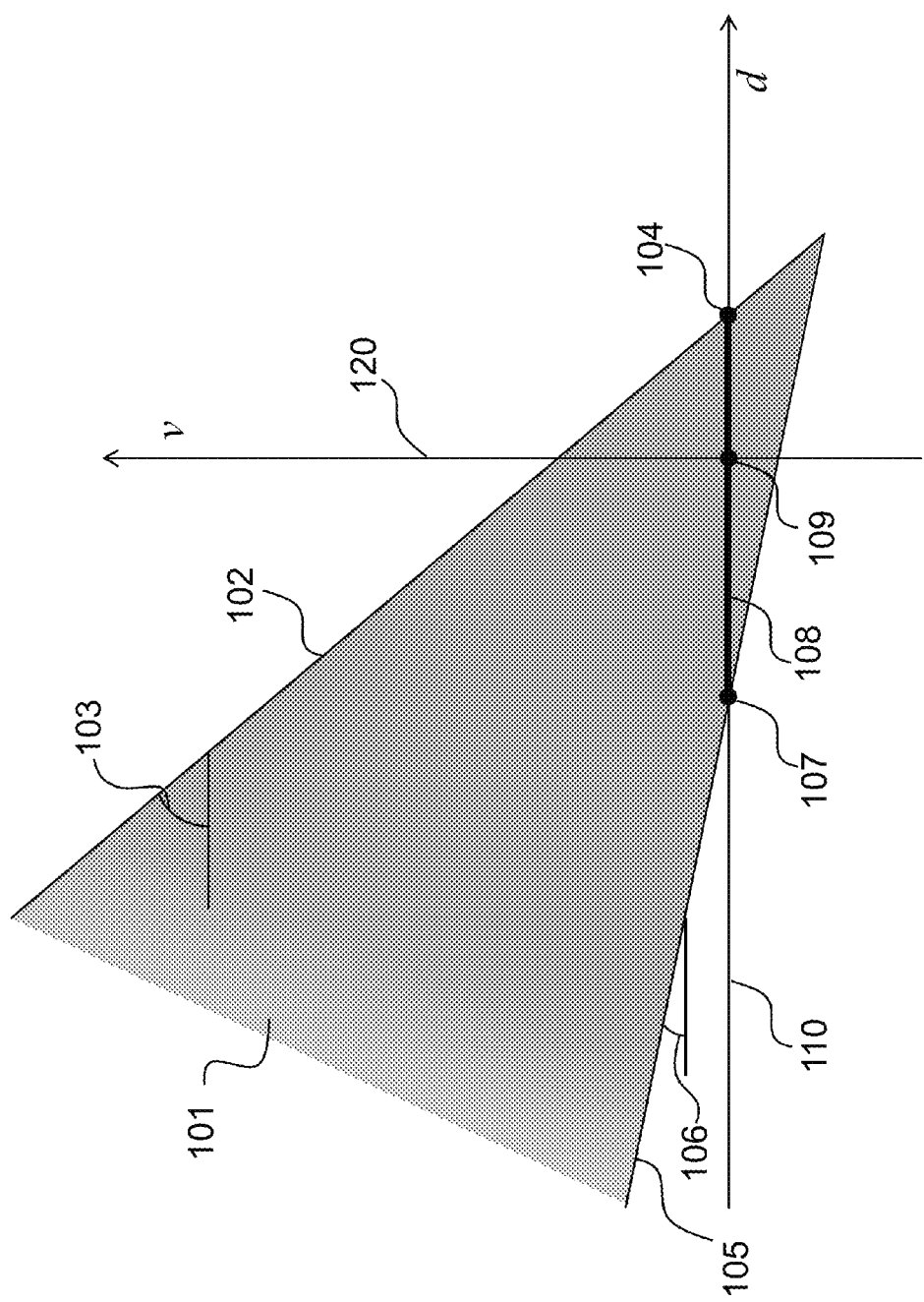
FIG. 3 is an example of the feasible region for the movement of the train defined by linear stopping constraints according to one embodiment of the invention.

FIG. 3 shows an example of the feasible region 101 for the movement of the train defined by linear stopping constraints according to one embodiment of the invention. In this embodiment, the upper curve is a first line 102 with a first slope 103, and the lower curve is a second line 105 with a second slope 106 and the first slope is greater than the second slope. This embodiment simplifies the selection of the stopping constraints in determining the feasible region for stopping the train.

For example, the constraints can be written in a linear form according to $$v(t) \leq \gamma_{max}(\epsilon_{max} - d(t))$$

$$v(t) \geq \gamma_{min}(\epsilon_{min} - d(t)), \quad (2)$$

wherein $\gamma_{max}$, $\gamma_{min}$ are two coefficients where $\gamma_{min} > 0 \gamma_{max} > \gamma_{min}$. If the constraints in (2) are satisfied at any time instants, then the train stops between $\epsilon_{max}$ and $\epsilon_{min}$.

A cone-shaped a region 101 in the space of train positions 110 and train velocities 120 is referred herein as a soft landing cone. The region 101 is delimited by two lines, each corresponding to one of the equations in (2), satisfied with equality. The upper border 102 of the soft landing cone is defined by $\gamma_{max}$ and $\epsilon_x$ where $\gamma_{max}$ determines the slope 103 and $\epsilon_{max}$ determines the intersect 104 of the upper border with the line of 0 velocity. Similarly the lower border 105 of the soft landing cone is defined by $\gamma_{min}$ and $\epsilon_{min}$ where $\gamma_{min}$ determines the slope 106 and $\epsilon_{min}$ determines the intersect of 107 the lower border with the line of zero velocity.

If the train positions and velocities remain in the soft landing cone the train stops at the stopping range. The parameters $\epsilon_{max}$ and $\epsilon_{min}$ define the desired stopping range, because the train stops in the area 108 between positions $\epsilon_{max}$ and $\epsilon_{min}$ including the stopping position 109 with d=0.

In addition some variations of this embodiment determine the parameters $\gamma_{max}$ and $\gamma_{min}$ using the desired timing to stop. For example, the embodiment can select the first slope 103 based on a minimal stopping time, and select the second slope 106 based on a maximal stopping time.

Figure 4:
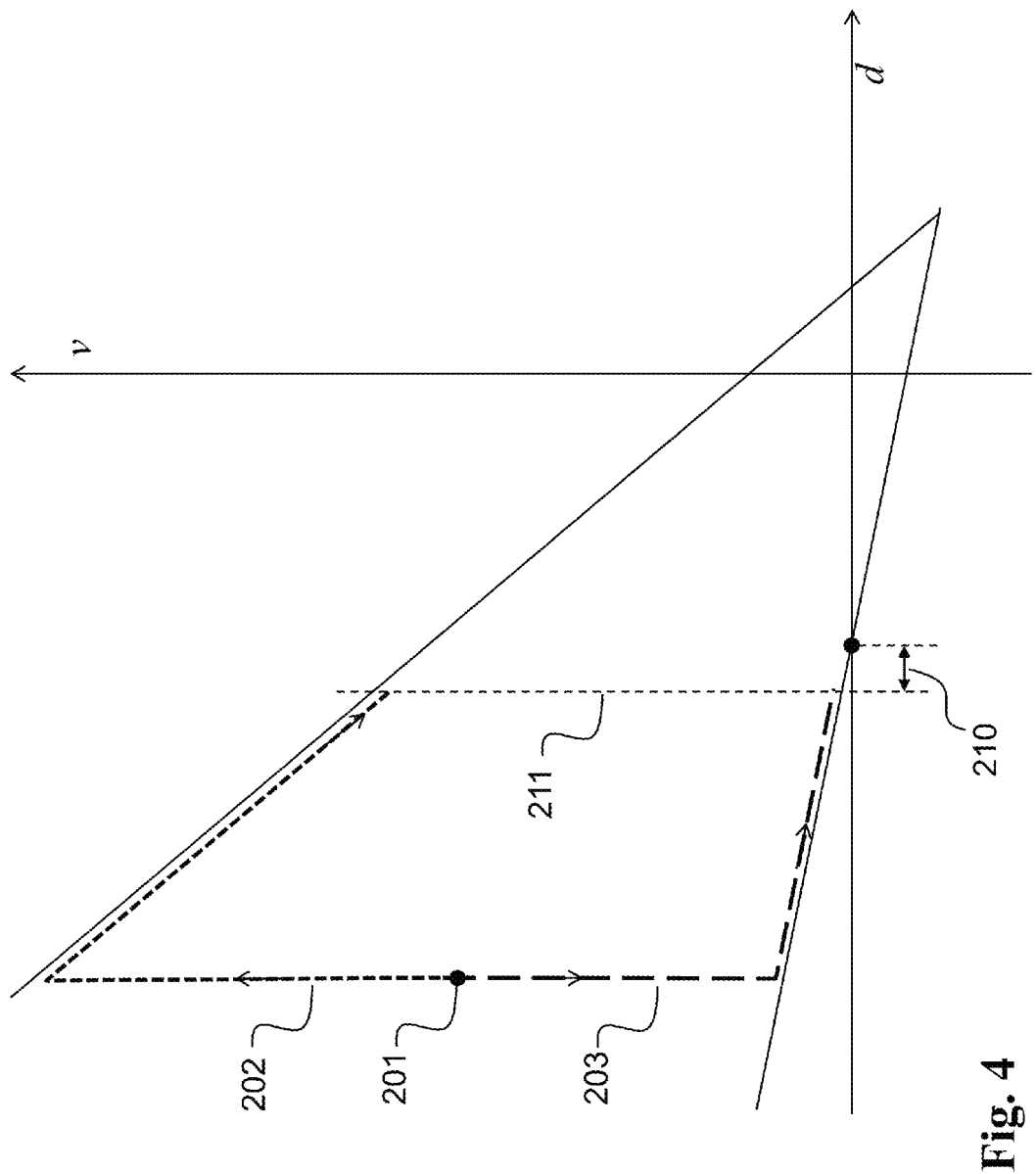
FIGS. 4 and 5 are plots for selecting the parameters of the stopping constraints based on desired time of arrival of the train according to one embodiment of the invention.
Figure 5:
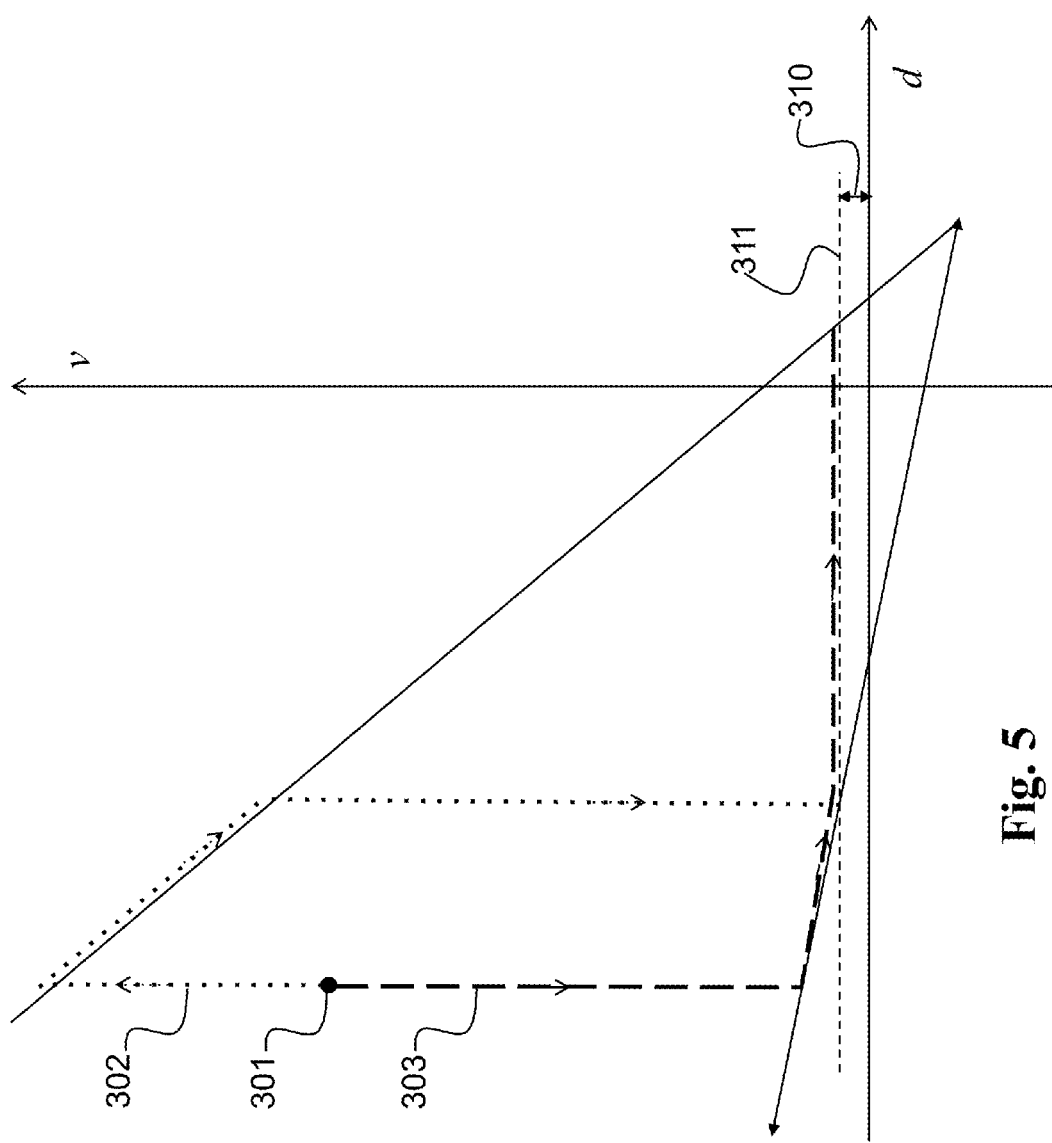

FIGS. 4 and 5 show plots for selecting the parameters of the stopping constraints based on desired time of arrival of the train. As shown in FIG. 4, for given $\gamma_{max}$, $\gamma_{min}$, and initial position 201 $d(0)$, for any $\rho>0$ defining a tolerance to the acceptable range of stop positions 210, the line $d=\epsilon_{min}-\rho$, 211, in the soft landing cone is reached in the time interval $$\hat{t} \in \left[ \frac{1}{\gamma_{max}} \log\left( \frac{\varepsilon_{max} - d(0)}{\varepsilon_{max} - \varepsilon_{min} + \rho} \right), \frac{1}{\gamma_{min}} \log\left( \frac{\varepsilon_{min} - d(0)}{\rho} \right) \right] \quad (3)$$

wherein the upper and lower bounds corresponds to corresponds to the time of the sequence of positions and velocities described by a line 203 for the upper bound and by a line 202 for the lower bound.

Similarly, as shown in FIG. 5, for given parameters $\gamma_{max}$, $\gamma_{min}$, and initial position 301 $d(0)$, for any $\sigma>0$ defining a tolerance to the stop velocity 310, the line $v=\sigma$ 311 in the soft landing cone is reached at $$\hat{t}(\sigma) \in \left[ \frac{1}{\gamma_{max}} \log\left( \frac{\gamma_{max}(\varepsilon_{max} - d(0))}{\gamma_{max}(\varepsilon_{max} - \varepsilon_{min}) + \sigma \frac{\gamma_{max}}{\gamma_{min}}} \right), \right. \quad (4)$$
$$\left. \frac{1}{\gamma_{min}} \log\left( \frac{\gamma_{min}(\varepsilon_{min} - d(0))}{\sigma} \right) + \frac{\varepsilon_{max} - \varepsilon_{min}}{\sigma} + \left( \frac{1}{\gamma_{min}} - \frac{1}{\gamma_{max}} \right) \right],$$

which corresponds to the sequence of positions and velocities described by a line 303 for the upper bound and a line 302 for the lower bound.

Reducing a value of the parameter $\gamma_{min}$ increases the maximum time to reach the stopping position. Increasing a value of the parameter $\gamma_{max}$ decreases the minimum time to reach the stop. Also, taking $\gamma_{max}$ and $\gamma_{min}$ with closer values reduces the difference between minimum and maximum time to stop, while on the other hand reduces the area of the soft landing cone which amounts to reducing the number of possible train trajectories in such a cone.

Constrained Control

Constrained control of the train that enforces the constraints in (1) guarantees that the train stops in the stopping range. However, the train position and velocity depends on the actual train dynamics generated by actuating the traction and braking system of the train. Thus, some embodiments of the invention determines a control system to actuate the train traction and braking system so that the train dynamics satisfies the constraints in (1).

The train dynamics can be described by $$\dot{x}(t) = f(x(t), u(t), p)$$

$$y(t) = h(x(t)) \quad (5)$$

where x is the train state, u is the train input, p are the train parameters, y=[d v] is the output vector, f describes the variation of the state as a function of the current state, current input and current parameters, and h describes the output as a function of the current state, only.

The state and input variables in (5) are subject to the constraints $$x \in \mathcal{X}, \quad (6)$$

$$u \in \mathcal{U}, \quad (7)$$

where (6) define a set of admissible values for the state variables, and (7) a set of admissible values for the input variables in (5).

In one embodiment of this invention, for a train provided with rolling stocks (wheels) the train dynamics (5) is described by an affine model obtained by considering a velocity-affine model for the resistance force to motion, $$F_{res}(t) = -c_0 \mu g - c_1 v(t), \quad (8)$$

where $c_0$ is the coefficient of the constant term which models rolling resistance, and $c_1$ is the coefficient of the linear term which models bearing friction and air resistance at low speeds, $\mu$ is the friction coefficient between the rails and the rolling stocks, g is the gravity acceleration constant. In this embodiment the train dynamics is described by $$\dot{d}(t) = v(t), \quad (9)$$

$$\dot{v}(t) = \frac{k_a}{rm} \chi(t) - \frac{c_0 \mu g}{m} - \frac{c_1}{m} v(t),$$

$$\dot{\chi}(t) = -\frac{1}{\tau_a} \chi(t) + \frac{1}{\tau_a} u(t),$$

where m is the train mass, r is the radius of the wheels, $k_a$ is the maximum force, $\tau_a$ is the actuator time constant.

The affine model of the train dynamics is $$\dot{x}(t) = A(p)x(t) + B(p)u(t) + B_w w(p) \quad (10)$$

where the state is $x=[d v \chi]'$ the input u is the command to the force generating actuators from traction (when positive) and braking (when negative), is the constant resistance term obtained from (9) and the matrices A(p), B(p), are obtained also from (9), where the vector of parameters p include the train mass, the friction coefficient, the gravity acceleration constant, the maximum force, the actuator time constant. In model (10)

$$B_w = \begin{bmatrix} 0 \\ -1 \\ 0 \end{bmatrix}, w(p) = \frac{c_0 \mu g}{m}. \qquad (11)$$

In other embodiments of this invention similar models can include other effects, for instance the effects of the railroad grade. Thus, the train control system selects the values for the train input function u that generates admissible solution for $$\dot{x}(t) = f(x(t), u(t), p) \qquad (12)$$

$$y(t) = \begin{bmatrix} d(t) \\ v(t) \end{bmatrix} = h(x(t))$$

$$v(t) \le \Gamma_{max}(\varepsilon_{max} - d(t))$$

$$v(t) \ge \Gamma_{min}(\varepsilon_{min} - d(t))$$

$$x(t) \in \mathcal{X}, u(t) \in \mathcal{U},$$

where the sets $\mathcal{X}$, $\mathcal{U}$ describe admissible values for the state and input (e.g., maximum and minimum velocity, maximum and minimum actuator positions, etc), and the solution is sought form current time T for all times in the future (i.e., [T, $t_f$], where $t_f = \infty$).

For instance, the sets X, U can model ranges on allowed velocity, the range of actuators, the range of torques obtained by the braking and traction system, and other specific constraints that describe the desired operation of the train system.

For instance, the constraint $$\dot{v} \le 0,$$

which imposes that the train constantly decelerates, i.e., no increase in velocity is allowed, or its relaxed form $$\dot{v} \le \psi(-d),$$

where $\psi$ is a nonnegative, monotonically decreasing function, while d<0 relaxes the previous constraints by allowing greater acceleration when the train is closer to the stopping position, to improve accuracy of the control.

Some embodiments of this invention optimizing the movement of the train from the current state to subsequent states, and determine a solution to (12) by solving the constrained optimal control problem $$\min F(x(t_f)) + \int_{t_0}^{t_f} L(x(t), u(t))dt \qquad (13)$$

$$\dot{x}(t) = f(x(t), u(t), p)$$

$$y(t) = \begin{bmatrix} d(t) \\ v(t) \end{bmatrix} = h(x(t))$$

$$v(t) \le \Gamma_{max}(\varepsilon_{max} - d(t))$$

$$v(t) \ge \Gamma_{min}(\varepsilon_{min} - d(t))$$

-continued $$x(t) \in \mathcal{X}, u(t) \in \mathcal{U}$$

$$x(t_0) = x_0,$$

where $t_0$ is the initial time, $x_0$ is the state at the initial time, F is the terminal cost function and L is the stage cost function. If the problem in (13) can be solved for final time $t_f = \infty$, then the stopping constraints are always satisfied and the train stops where required.

However, the problem in described in Equations (12) and (13) require the computation of an infinitely long control signal for a system subject to an infinite number of constraints are difficult to solve in the train control system directly. Thus, some embodiments solve the problem in described in Equations (12) and (13) in a receding horizon fashion.

Figure 6:
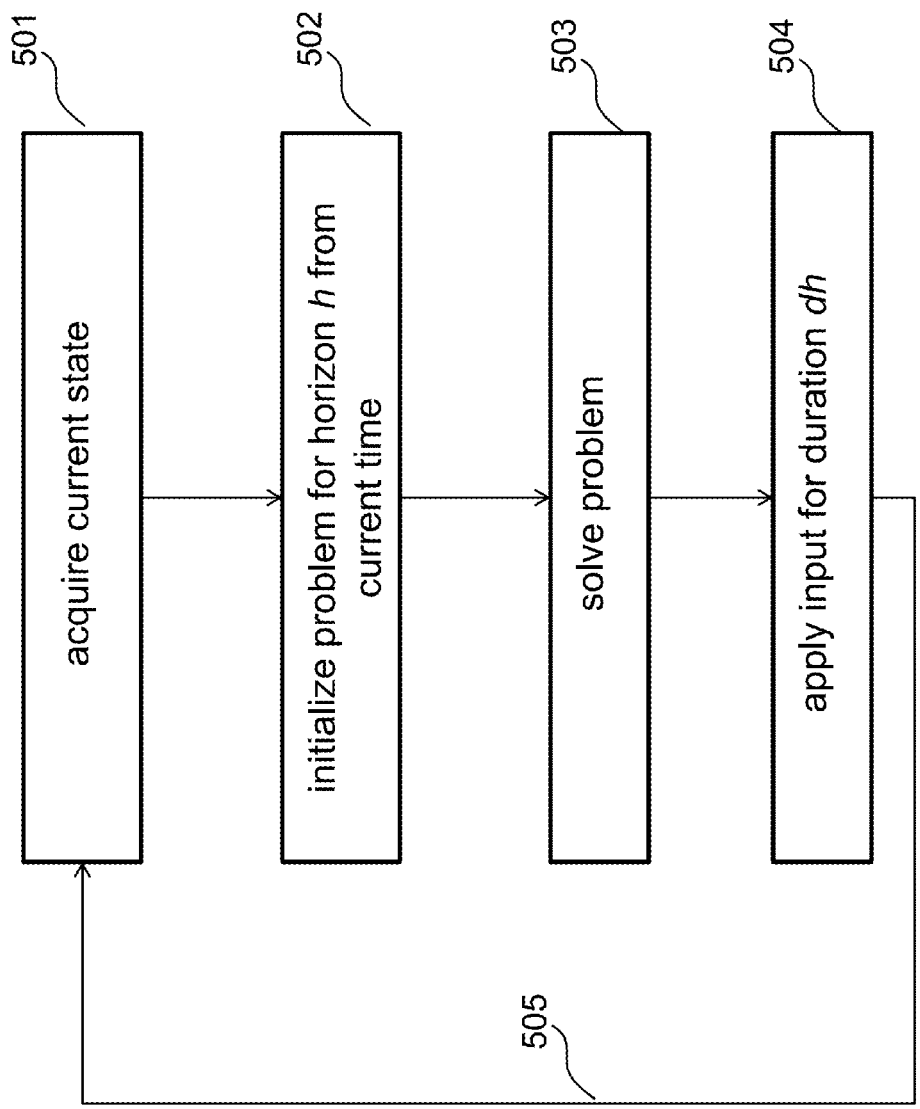
FIG. 6 is a block diagram of a method for predictive constrained control according one embodiment of the invention.

FIG. 6 shows a block diagram of a method for predictive constrained control according one embodiment of the invention. The method determines 501 a current state x(T) of the movement of the train at a certain time T, and the movement of the train is optimized 503 from the current state to subsequent states set $t_0 = T$, $t_f = T + h$ 502 over a finite horizon of time. The optimization 503 solves the constrained optimization problem subject to the stopping constraints to produce a sequence of control inputs for the horizon of time h.

The method selects and applies 504 a first control input from the sequence of control inputs specifying the control action for a next time step of control. For example, the finite horizon control input signal u is applied during the time interval [T, T+dh] 504. Then 505, at time T+dh, where dh<h a new problem is solved with $t_0 = T + dh$, $t_f = T + dh + h$ and the newly computed input signal is applied, and the steps of the method are iteratively repeated.

Control Invariant Subset

Figure 7A:
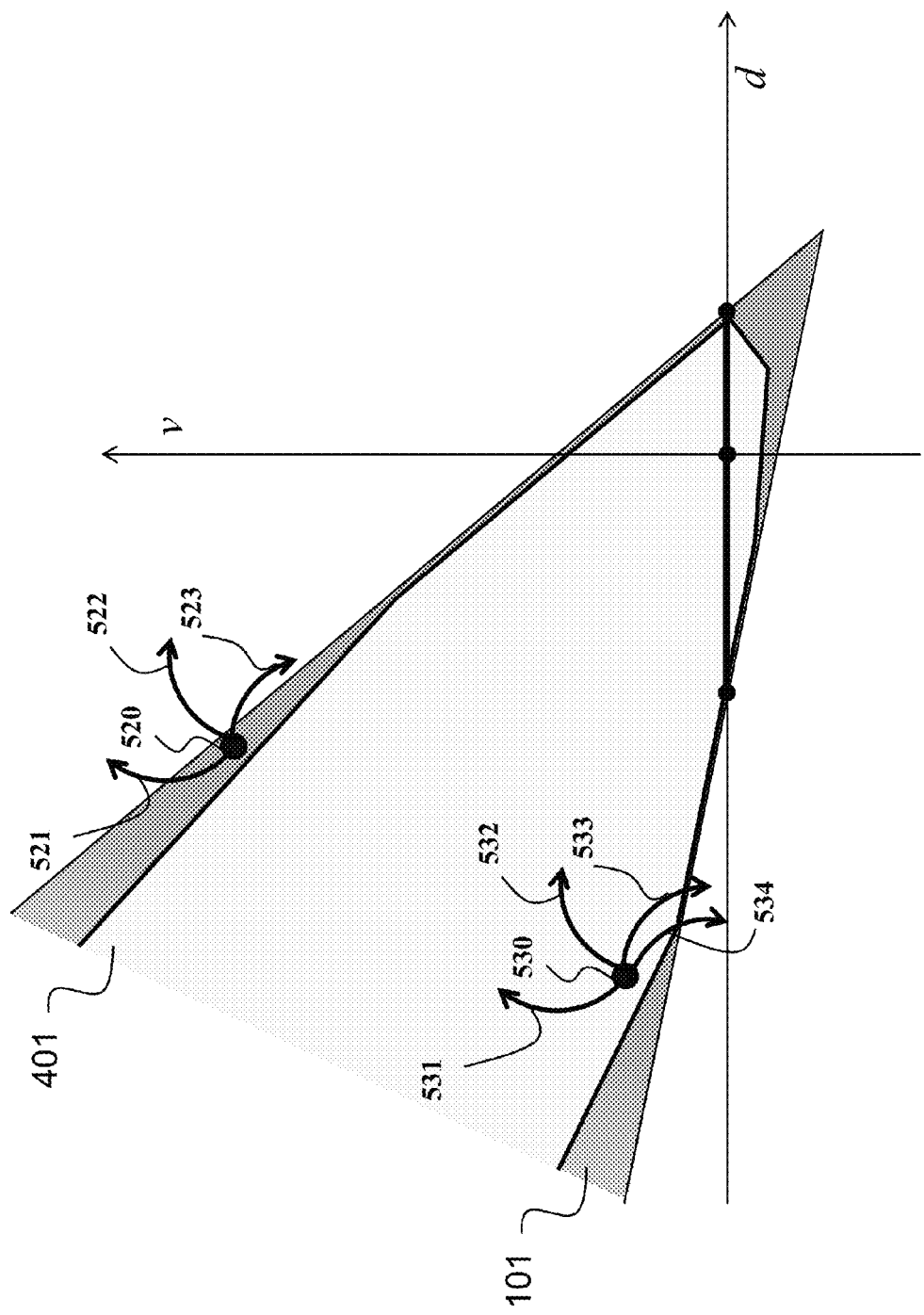
FIG. 7A is an example control invariant subset of the feasible region according one embodiment of the invention.

FIG. 7A shows an example control invariant subset of the feasible region and selection of a control action maintaining a state of the train within a control invariant subset. According to various embodiments of the invention, for each state within the control invariant subset there is at least one control action maintaining the state of the train within the control invariant subset.

Due to the nature of receding horizon control, the existence of a solution for a certain horizon does not by itself guarantees the existence of the solution for a subsequent horizon. Specifically, while the receding horizon solution makes the problem in (13) computationally feasible, it is not possible to guarantee that such problem always has a solution. In particular it is possible that the problem in (13) solved at time T has a solution, but the one to be solved at time T+dh does not. This is due to the fact that as the horizon is shifted, the constraints in (2), (6), (7) have to be enforced on a new piece of the trajectory, i.e., during the time interval [T+h, T+dh+h] that was not account for before.

For example, the state of the machine and a state of the train 520 can be optimal and feasible for one iteration, but all control actions 521-523 that controller is allowed to take during the next iteration can bring a state of the train outside of the feasible region 101.

Some embodiments of the invention are based on yet another realization that it is possible to select a subset 401 of the feasible region 101, such that from any state of the train within that subset, there is a control action maintaining the state of the train within the subset. For example, for any state such as a state 530 within the subset 401 and within all possible control actions 531-534 that the controller can execute, there is at least one control action, e.g., actions 531 and 532, that maintains the state of the train within the control invariant subset 410.

Accordingly, if a control action for controlling the operation is selected such that the state of the train remains in that special subset 401 of the feasible region, and the feasible region is generated also according to Equation (1), then there is a guarantee that it is possible to determine the sequence of control actions forming an ad-hoc run-curve leading the train from the current position to the stopping position.

For example, one embodiment determines a discretized version of the problem in (13) by considering a sampling period dh and obtaining a discrete time model for the dynamics in (5) which is $$x(t+dh) = f_d(x(t), u(t), p)$$

$$y(t) = h_d(x(t)), \qquad (14)$$

wherein given a state x and a control input u, $f_d(x,u,p)$ is the updated state.

Based on the discrete time model, the constrained control is $$\min F(x(N)) + \sum_{k=0}^{N} L(x(k), u(k)) \qquad (15)$$

$$x(k+1) = f_d(x(k), u(k), p)$$

$$y(k) = \begin{bmatrix} d(k) \\ v(k) \end{bmatrix} = h_d(x(k))$$

$$v(k) \le \Gamma_{max}(\varepsilon_{max} - d(k))$$

$$v(k) \ge \Gamma_{min}(\varepsilon_{min} - d(k))$$

$$x(k) \in \chi, \; u(k) \in \mathcal{U}$$

$$x(0) = x(t),$$

wherein x(k+i) is the predicted state value at time t+i dh, x(t+i dh).

At any time t of the control one embodiment solves the problem (15) on the future interval [t, t+N dh] and a first control input u(0) from the sequence of control inputs specifying the control action for a next time step of control is applied during [t, t+dh] then the new state x(t+dh) is read and a new problem is solved. Problem (15) is not guaranteed to be feasible. However, some embodiments modify the constraints to guarantee the feasibility.

The set of the feasible states $\mathcal{X}_f$ is the set that includes all the values for the state x satisfying the Equations (2), (6), (7). The control invariant subset $C_x$ of the set of feasible states used by some embodiments is control invariant with respect to dynamics (14) and constraints (2), (6), (7) that is, if $x \in C_x$, there exists a value $u \in \mathcal{U}$ such that $f_d(x,u,p) \in C_x$.

Some embodiments also determine a control invariant admissible input set, such that any control input of the control invariant admissible input set applied to any state in the control invariant set maintains the state of the train within the control invariant subset. The control invariant admissible input set in some embodiments, $C_u(x) = \{u \in \mathcal{U} : f_d(x,u,p) \in C_x\}$, is the set of inputs that can be applied to any state in the control invariant set with the guarantee that the updated state is in the invariant set.

Accordingly, some embodiments select a control action for the movement of the train corresponding to a control input from the control invariant admissible input set. The modified constrained control problem is $$\min F(x(N)) + \sum_{k=0}^{N} L(x(k), u(k)) \qquad (16)$$

$$x(k+1) = f_d(x(k), u(k), p)$$

$$y(k) = \begin{bmatrix} d(k) \\ v(k) \end{bmatrix} = h_d(x(k))$$

$$x(k) \in C_x, \; u(k) \in C_u(x(k))$$

$$x(0) = x(t).$$

If $x(t) \in C_x$ then the modified problem is feasible, and when the input u is applied to the train, the problem generated at the next time step t+dh is going to be feasible because $x(t+dh) \in C_x$. Thus, if the first problem generated when the controller is initialized is feasible, the generated trajectory always satisfies constraints (2) and hence the train stops where required.

Robust Control Invariant for Uncertain Parameters

In some cases the value of the variables in the parameter vector p in (5) is not exactly known. For instance, only an upper and lower bound may be known, or more generally that the parameter vector p has one of the values in a set P, which may also be constantly changing within this set.

It is realized that the control strategy can be modified to guarantee precise stopping in the presence of constraints by ensuring that the constraints in (2), (6), (7) are satisfied at any time instant for all value of the parameter vector. For example, some embodiments determine the control invariant subset for a set of possible parameters of the train, such that for each state within the control invariant subset there is at least one control action maintaining the state of the train within the control invariant subset for all parameters from the set of possible parameters of the train.

To this end in place of the sets $C_x$, $C_u(x)$ in (16) some embodiments use the sets $C_x(P)$, $C_u(x,P)$. The set $C_x(P)$ is a subset of $\mathcal{X}_f$ such that for all states x that are in $C_x(P)$, there exists an input u such that $f_d(x,u,p) \in C_x(P)$, for all the values p in P. The set $C_u(x,P)$, which is the set of inputs that can be applied to state x in $C_x(P)$, such that $f_d(x,u,p) \in C_x(P)$ is in $C_x(P)$ for all p in P.

Thus the problem for stopping the train with uncertain parameter values is $$\min F(x(N)) + \sum_{k=0}^{N} L(x(k), u(k)) \qquad (17)$$

$$x(k+1) = f_d(x(k), u(k), \hat{p})$$

$$y(k) = \begin{bmatrix} d(k) \\ v(k) \end{bmatrix} = h_d(x(k))$$

$$x(k) \in \tilde{C}_x(P), \; u(k) \in \tilde{C}_u(x(k), P)$$

$$x(0) = x(t),$$

where $\hat{p} \in P$ may not be the actual value of the parameters, which is unknown.

Figure 7B:
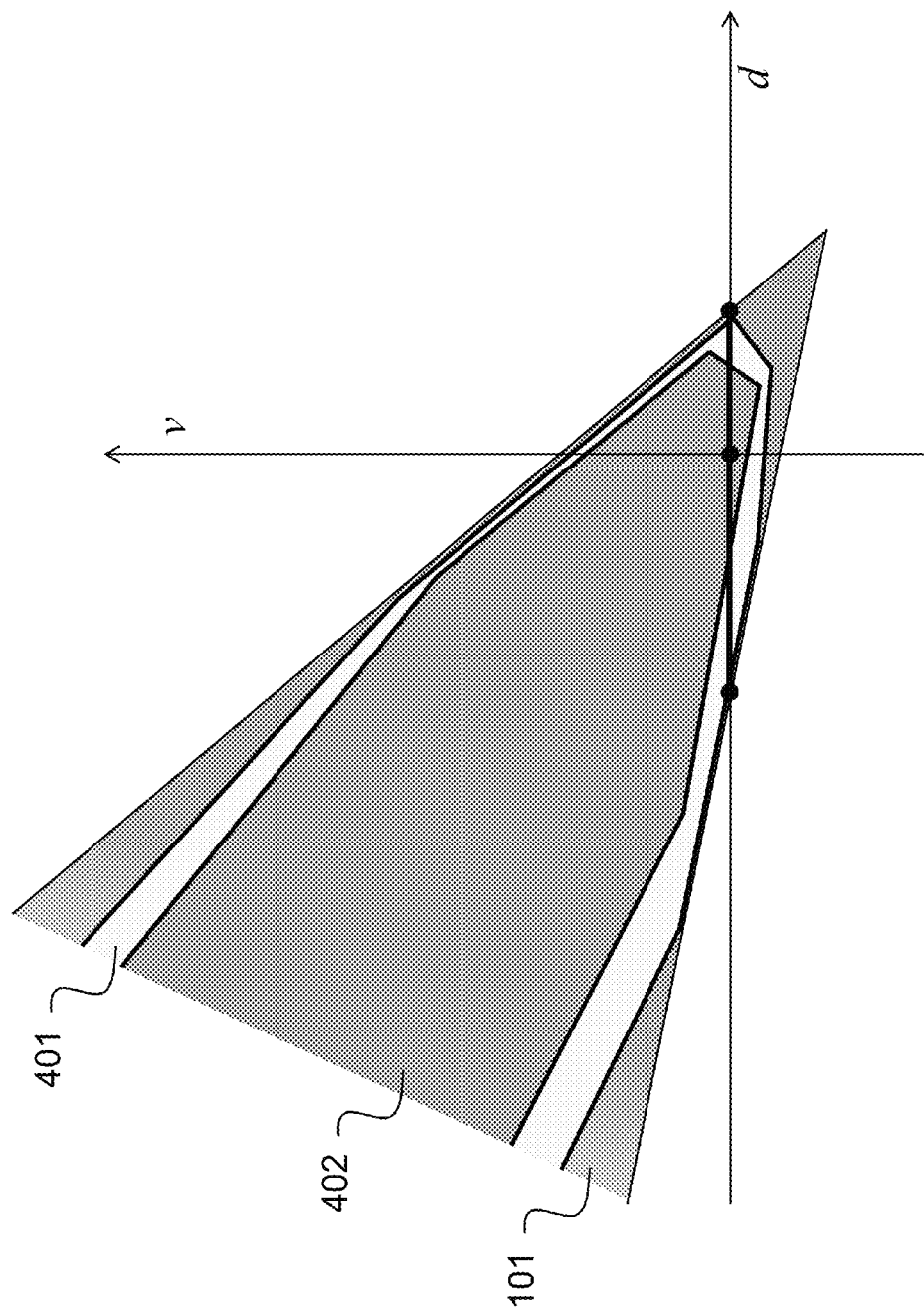
FIG. 7B is a schematic of the relation between different feasible regions according one embodiment of the invention.

If $x(t) \in C_x(P)$ then the modified problem is feasible, and when the input u is applied to the train, the problem generated at the next time step t+dh is also feasible because $x(t+dh) \in C_x(P)$ for all real values of p in P. Thus, if the first problem generated when the controller is initialized is feasible, the generated trajectory always satisfies constraints in (2), (6), (7) and hence the train stops where required FIG. 7B shows the relation between different feasible regions. Then the feasible regions 101 includes the control invariant set 401, which in turn include the control invariant set 402 for a set of possible parameters of the train.

Control Invariant Set Computation

Figure 8:
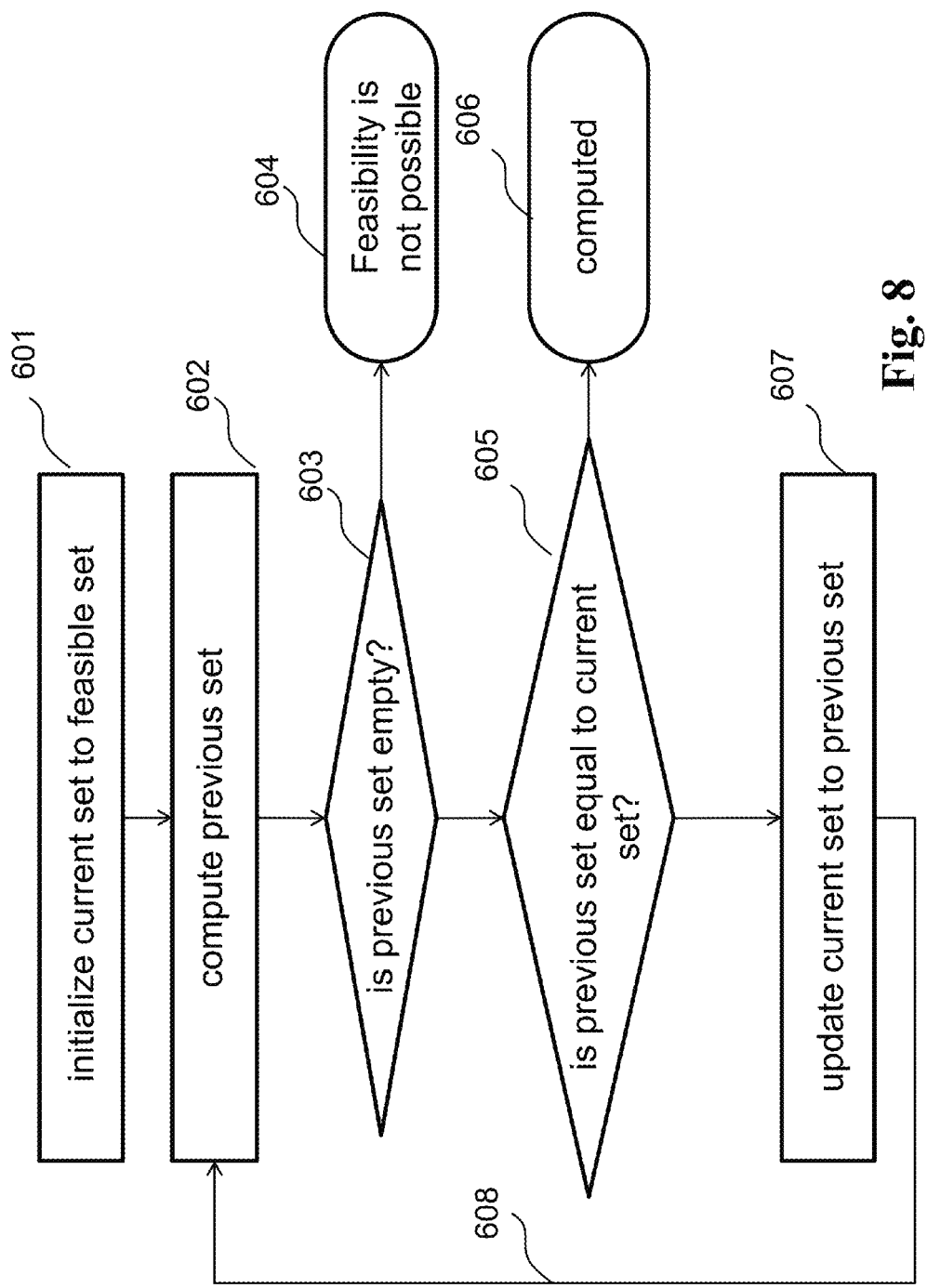
FIG. 8 is a block diagram of a backward-reachable region computation for determining the control invariant subset starting from the feasible region according one embodiment of the invention.

FIG. 8 shows a block diagram of a backward-reachable region computation for determining the control invariant subset starting from the feasible region. The backward-reachable region computation determines the sets $C_x(P)$, $C_u(x,P)$ for uncertainty set P. The sets $C_x$, $C_u(x)$, can be generated by the same computation where the set P includes only a single value.

The backward-reachable region computation initializes 601 a current set $\mathcal{X}_c$ to the feasible set $\mathcal{X}_f$ and determines 602 a previous set of states $\mathcal{X}_p$ as a subset of the current set $\mathcal{X}_c$ such that for all states x in $\mathcal{X}_p$ there exists an input u in $\mathcal{U}$ such that for all the possible values of the parameters p in P, the updated state lies in the current set $\mathcal{X}_c$.

If 603 the previous set $\mathcal{X}_p$ is empty, it is not possible 604 to guarantee feasibility of problem (17), which means that the set P where the parameters should be reduced in size. If 605 the current set and the previous set are equal, that is also 606 the set $C_x(P)$ otherwise, the previous set is assigned 607 to be the current set and the computation iterates 608 again. When the set $C_x(P)$ is found the lastly computed set of state-input couples is the control invariant admissible input set $C_u(x,P)$ for all $x \in C_x(P)$.

Figure 9:
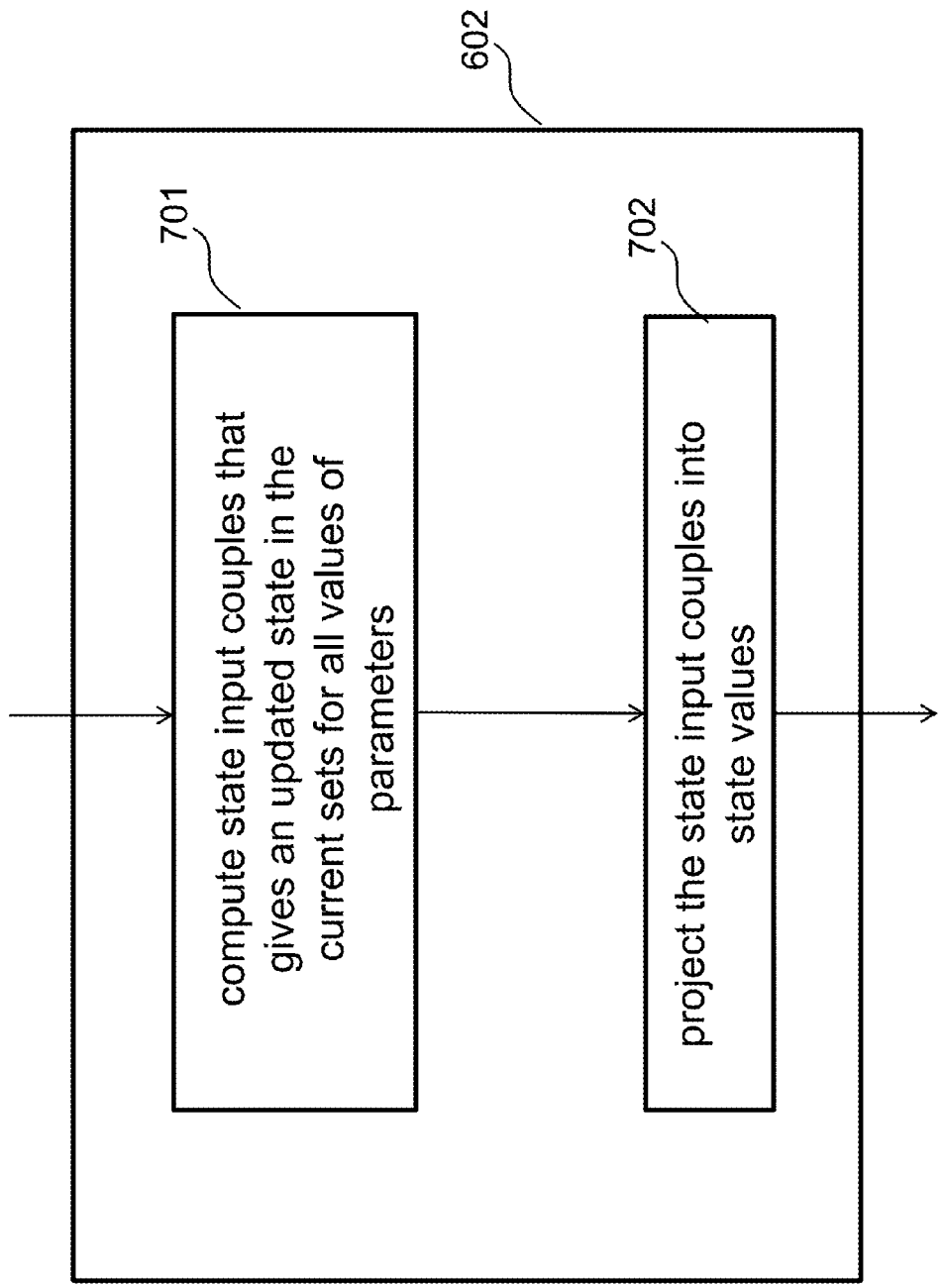
FIG. 9 is a block diagram of an exemplar implementation of determining the previous set of states according one embodiment of the invention.

FIG. 9 shows a block diagram of an exemplar implementation of determining 602 the previous set of states according to one embodiment. The embodiment identifies 701 the state-input couple that generates an updated state that is in the current set for all the values of the parameters, and projects 702 the state input couples into state values, i.e., the embodiment identifies the states that belongs to at least one of such state-input couples.

When the stopping constraint are define by the constraints in Equation (2), the computations of step 701 can be further simplified In this case, the sets $\mathcal{X}$ and $\mathcal{U}$ are described by linear inequalities, and a set of linear models described by matrices $A_i$, $B_i$, $i=1, \ldots, l$ and $B_w$, and disturbance set $co(\{w_j\}_{j=1}^{\eta})$ and can be found such that for all x in $\mathcal{X}$, u in $\mathcal{U}$ $$f(x,u,p) \in co(\{A_i x(k)+B_i u(k)\}_{i=1}^{l}) \oplus B_w co(\{w_j\}_{j=1}^{\eta}) \quad (18)$$

for all p in P, where "co" denotes the convex hull and $\oplus$ denotes the set sum.

The linear models in (18) can be computed for instance by taking the maximum and minimum of the parameters that form vector p allowed by P, and/or of their combinations. Equations (18) convers also the case when all the parameters are perfectly known, since in that case only one model is used $l=1$, $\eta=1$.

Figure 10:
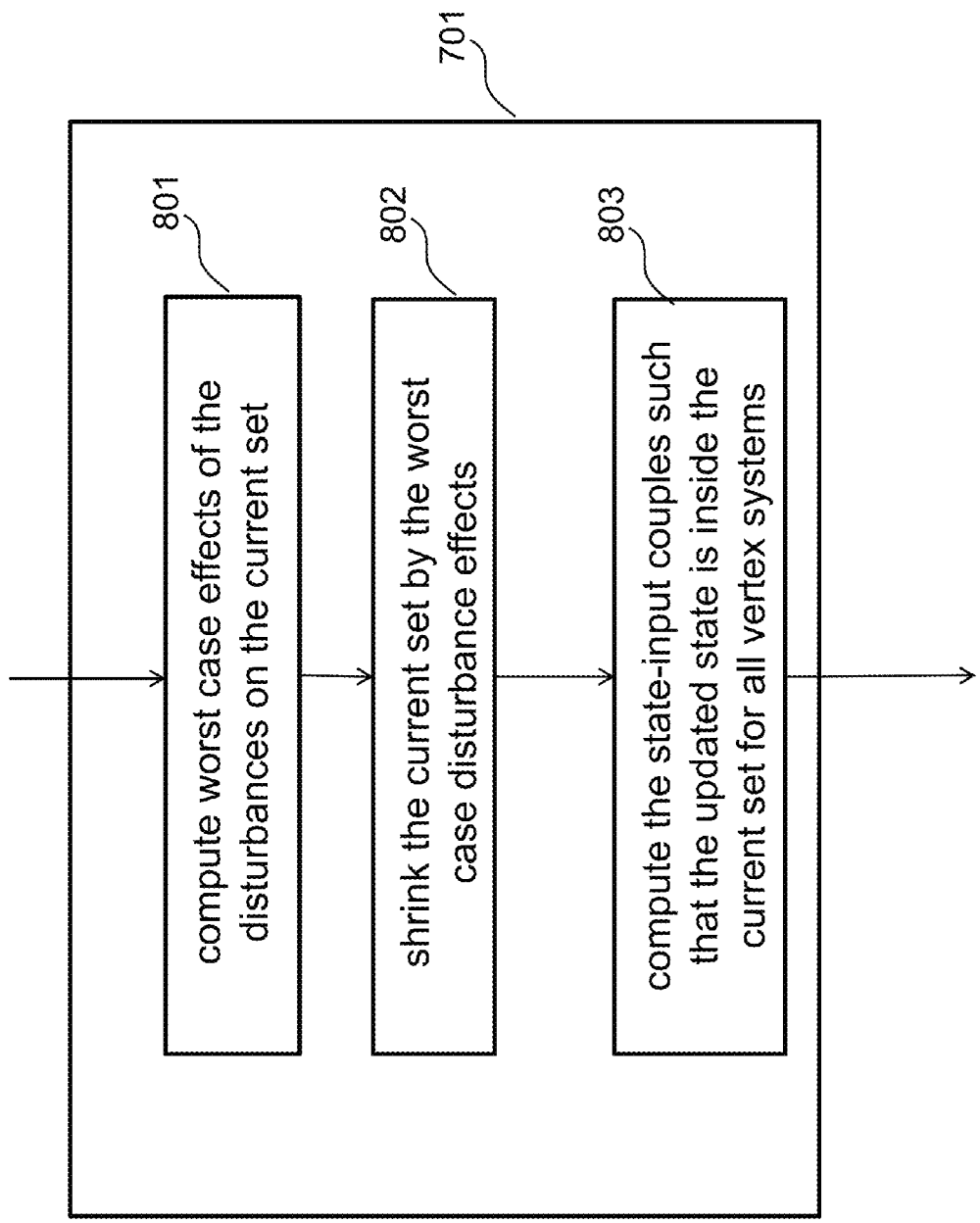
FIG. 10 is a block diagram of a method for computation of the couples of states-inputs according one embodiment of the invention.

FIG. 10 shows a block diagram of a method for computation of the couples of states-inputs 701 when Equations (18), (2) and linear inequalities describe the sets $\mathcal{X}$ and $\mathcal{U}$. The method considers the current set as $$H^{(c)} x \leq K^{(c)} \quad (19)$$

and determines 801 the worst case effects of the additive disturbance w on the current set, $$[S]_i = \max_{w \in co(\{w_j\}_{j=1}^{\eta})} [H^{(c)} B_w w]_i, \quad i=1, \ldots, n_q, \quad (20)$$

Next, the method reduces 802 the current set by the worst case disturbance effects to produce a reduced current set $\mathcal{X}_s$ described by $$H^{(c)} x \geq K^{(c)} - S_i, \quad (21)$$

and then determines 803 the couples (x, u) such that the updated state is inside the current set for all the vertex systems in (18), i.e., $A_i x + B_i u \in \mathcal{X}_s$, $\forall i=1, \ldots, l$.

Figure 11:
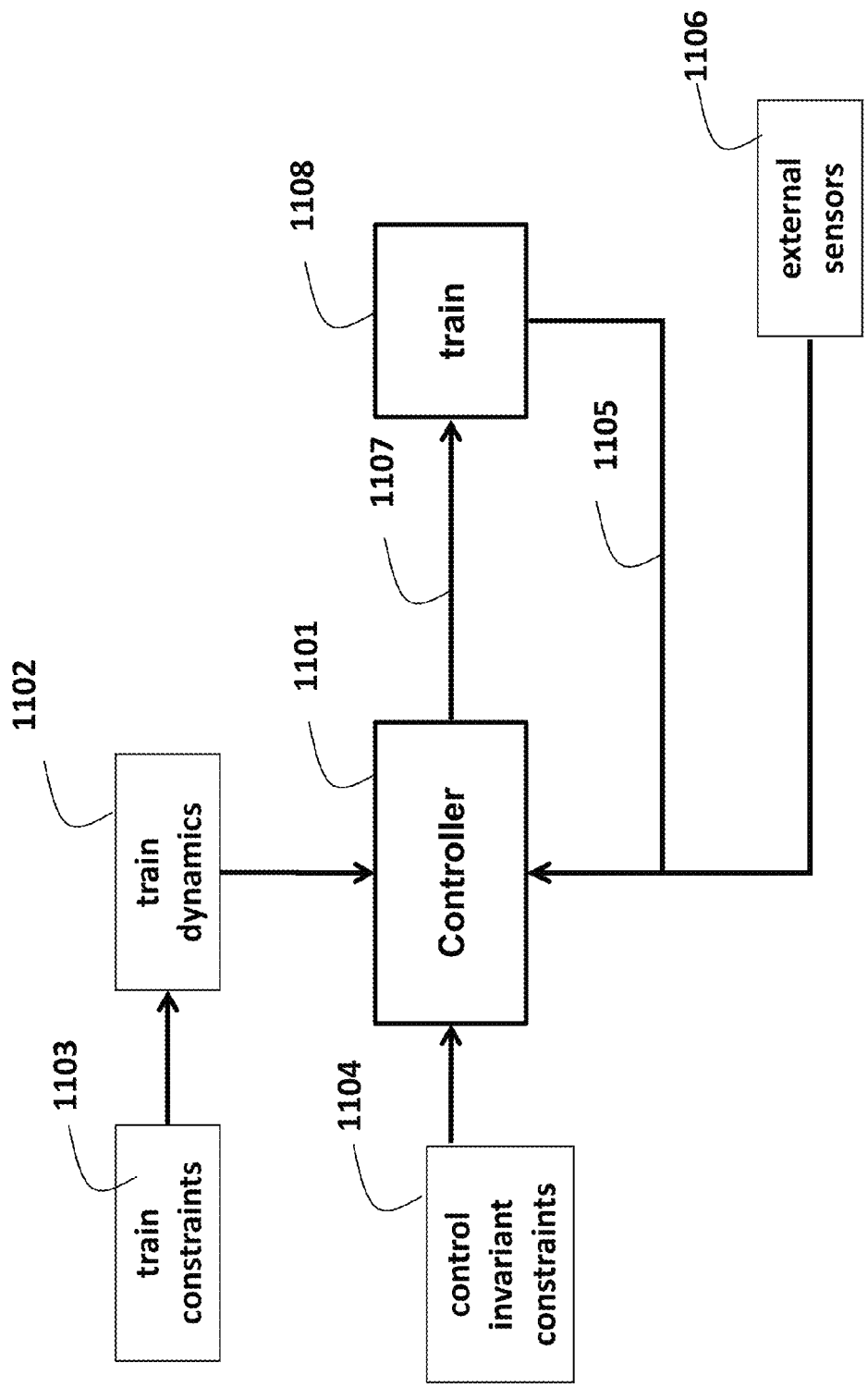
FIG. 11 is a diagram of a predictive control system according to according one embodiment of the invention.

Train Stopping Control Systems based on Control Invariant Sets and Soft Landing Constraints FIG. 11 shows a diagram of a predictive control system according ton some embodiments of the invention. The control system 1101 has a model of the train dynamics 1102 such as a model (14), the equations 1103 of the train constraints (6), (7), and the control invariant sets 1104. The controller receives information from train on board sensors 1105, such as wheel speed sensors, electric motor current, braking systems pressure, and possibly from external sensors 1106, such as GPS satellites, base stations, sensors along or within the rail tracks.

Based on such information the controller selects commands for the propulsion force needed to influence the train motion which are sent to the train 1108 and used in the propulsion system, where a positive force is actuated by the traction motors, and a negative force is actuated from the braking system. The controller may solve the problems (12) or (13) from current time T to $t_f = \infty$, thus obtaining full trajectory for the input that is sent to the train propulsion system. More commonly, the controller operates in a receding horizon strategy as described in FIG. 601 thus receiving data from sensors that amounts to acquiring the current state 501, initializing 502 and then solving 503 a finite time optimal control problem either (15), or (16), or (17), and commanding 504 the first component of the computed input to the train propulsion system.

If the constrained control of Equations (12) or (13) or (15) or (16) or (17) is solved always with a feasible solution, then the train stops in the desired range of locations. Furthermore, for the control described in Equations (16) and (17) guarantees that if the first problem solved when the control system is first activated is feasible, all the subsequent problems are feasible, and hence the train stops in the desired range of locations. It is also realized that in order for the first problem to be feasible, it is enough to initialize the controller when the current state x(t) of the train system is in the control invariant set, $x(t) \in C_x$ for (16) and $x(t) \in C_x(P)$ for (17).

Furthermore, it is realized that by using the control invariant subset determined using the backward-reachable region computation starting from the feasible region, the train control system does not require a calibration to achieve the primary target, because the control invariant subset is determined independently of all the controller calibration parameters, such as the length of the horizon, h, and the cost function components L, F.

These parameters can be selected to obtain secondary objectives of the controller such as minimum time stopping, for which L are selected as $$L = d^2, \quad (22)$$

minimum braking effort $$L = F^2, \quad (23)$$

which also provides smooth deceleration, minimum velocity stopping $$L = v^2, \quad (24)$$

minimum energy $$L = u_v^2 \qquad (25)$$

which penalizes only the use of traction motors by defining $u_v \geq F$, or a combination of the above functions. For (22), (24), F=L, for (23), (25) F=0. The horizon length h can be selected based on timing requirements since longer horizon provides better performance with respect to the select secondary objective, but requires longer computations for the controller to generate the commands.

In the embodiment using the dynamics on the right hand side of (18) are used, and the stopping constraints includes linear inequalities, the problems (15), (16), (17) can be converted into quadratic programming problems that can be solved more effectively.

Figure 12:
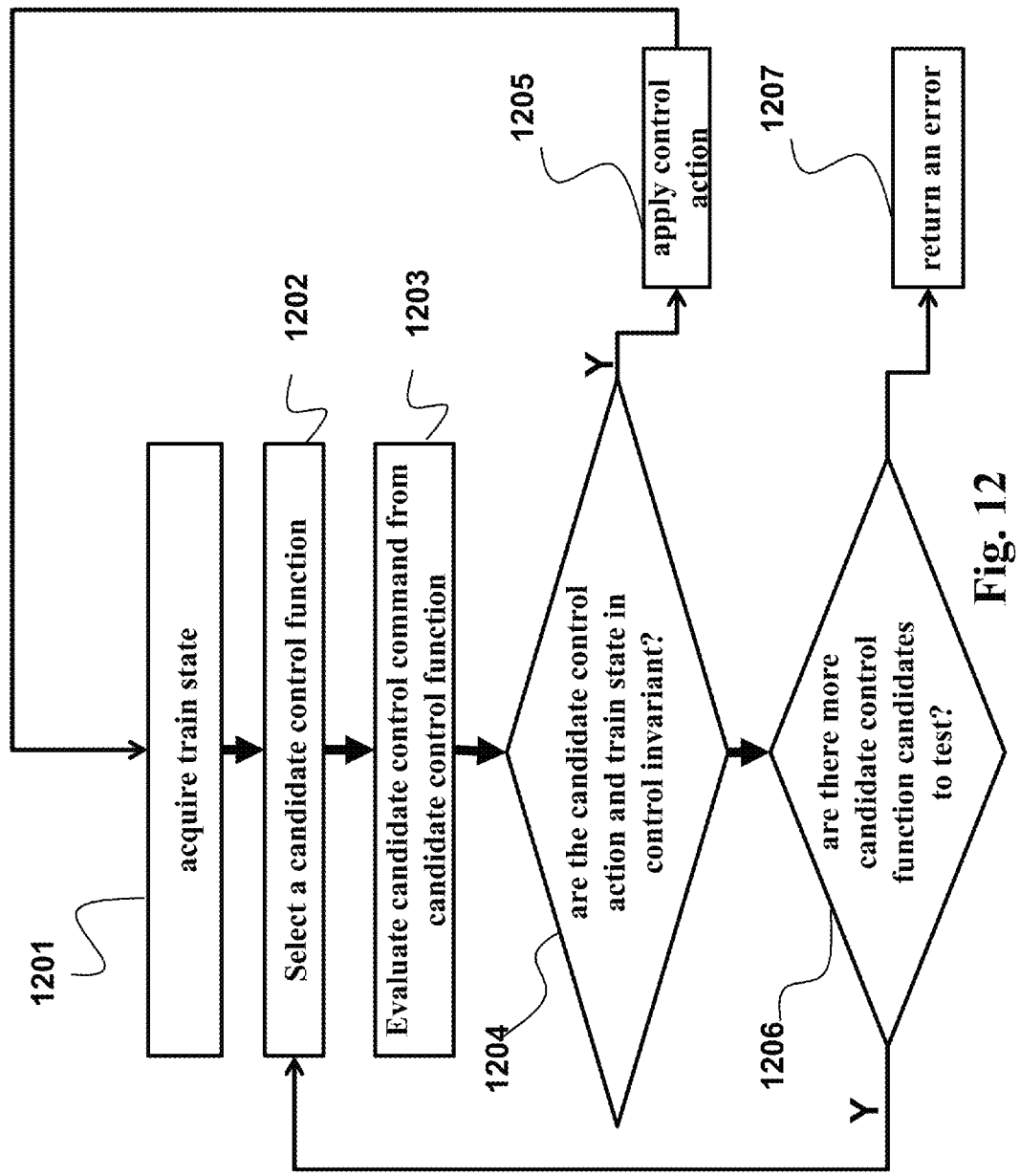
FIG. 12 is a block diagram of a controller that does not use a full model of the train dynamics and constraints according to an alternative embodiment of the invention.

FIG. 12 show a block diagram of a controller that does not use a full model of the train dynamics and constraints according to an alternative embodiment of the invention. This embodiment uses only the control invariant admissible input set $C_u(x)$ or $C_u(x,P)$, and a library of predefined control functions. For example, this embodiment determines a set of control actions moving the train from a current state to next states, and selects the control action from the set of control actions, if a next state corresponding to the control action is the control invariant subset.

For example, the embodiment acquires 1201 the train states from sensors 1105, 1106, then it selects 1202 one of the available control functions and evaluate the corresponding candidate control command 1203. Then, the embodiment checks 1204, if the control action u is in the control invariant admissible input set for the current state x, that is $u \in C_u(x)$ or $u \in C_u(x,P)$, and if so, that control action is applied 1205. Otherwise 1206, the embodiment checks if more candidate functions are available. If not 1207 an error is returned, otherwise another candidate function selection is operated. Because selecting a control action in the control invariant sets guarantees that the state remains in the control invariant set, unless an error is returned, the train stops in the desired stopping range.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for controlling of a movement of a train to a stop at a stopping position between a first position and a second position, comprising:
a constraint generating unit for determining constraints of a velocity of the train with respect to a position of the train forming a feasible area for a state of the train during the movement, such that an upper curve bounding the feasible area has a zero velocity only at the second position, and a lower curve bounding the feasible region has a zero velocity only at the first position, wherein the upper curve is a first line with a first slope, and the lower curve is a second line with a second slope and the first slope is greater than the second slope; and
a controller for controlling the movement of the train subject to the constraints.

2. The system of claim 1, further comprising:
a control invariant subset generating unit for determining a control invariant subset of the feasible region, wherein for each state within the control invariant subset there is at least one control action maintaining the state of the train within the control invariant subset, wherein the controller controls the movement of the train by selecting a control action maintaining the state of the train within the control invariant subset of the feasible region.

3. The system of claim 2, wherein the control invariant subset generating unit determines the control invariant subset using a backward-reachable region computation starting from the feasible region.

4. The system of claim 1, wherein the feasible area includes a current position of the train and a current velocity of the train, and wherein the first and the second positions define a stopping range for the train, such that the first position is closer to the current position of the train than the second position.

5. The system of claim 1, wherein the constraints are determined without having a predetermined run-curve leading the train from the current position to the stopping position.

6. The system of claim 1, wherein the upper curve is a first line with a first slope, and the lower curve is a second line with a second slope and the first slope is greater than the second slope.

7. The system of claim 1, wherein the first slope is selected based on a minimal stopping time, and the second slope is selected based on a maximal stopping time.

* * * * *